United States Patent
Mathes et al.

(10) Patent No.: US 8,382,200 B2
(45) Date of Patent: Feb. 26, 2013

(54) VEHICLE WITH TRANSPARENT ROOF AREA

(75) Inventors: Gerhard Mathes, Udenheim (DE); Gunther Heim, Lampertheim (DE); Dino Demma, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 12/902,911

(22) Filed: Oct. 12, 2010

(65) Prior Publication Data

US 2011/0084522 A1   Apr. 14, 2011

(30) Foreign Application Priority Data

Oct. 12, 2009   (DE) .......................... 10 2009 049 114

(51) Int. Cl.
*B60J 3/02* (2006.01)
*B60J 3/06* (2006.01)
(52) U.S. Cl. .................. 296/211; 296/214; 296/215
(58) Field of Classification Search .................. 296/211, 296/214, 215
See application file for complete search history.

(56) References Cited

U.S. PATENT DOCUMENTS

| | | |
|---|---|---|
| 2,856,810 A | 10/1958 | Frost |
| 5,193,457 A | 3/1993 | Hahn et al. |
| 5,324,568 A | 6/1994 | Coninx et al. |
| 5,405,184 A | 4/1995 | Jardin et al. |
| 5,507,547 A | 4/1996 | Hattass et al. |
| 2002/0030379 A1 | 3/2002 | Sturt et al. |

FOREIGN PATENT DOCUMENTS

| | | |
|---|---|---|
| DE | 4232660 C1 | 10/1993 |
| DE | 4311049 C1 | 6/1994 |
| DE | 4320947 A1 | 1/1995 |
| DE | 10019787 A1 | 10/2001 |
| DE | 10021136 A1 | 10/2001 |
| DE | 102006037128 A1 | 2/2008 |
| DE | 102006062542 A1 | 7/2008 |
| FR | 2723612 A1 | 2/1996 |
| FR | 2941735 A1 | 8/2010 |

(Continued)

OTHER PUBLICATIONS

British Patent Office, British Search Report for British Application No. 1017091.8, Feb. 9, 2011.

(Continued)

*Primary Examiner* — Dennis Pedder
(74) *Attorney, Agent, or Firm* — Ingrassia Fisher & Lorenz, P.C.

(57) ABSTRACT

A vehicle is provided with transparent roof area having at least one roof window tailored to fit into the roof structure. An adjustable darkening against exposure to incident light is provided toward the passenger compartment. The roof area has a first optically structured, immovably fixed surface and a second optically structured, movable surface. The first and second surfaces are arranged one over the other. The second surface here abuts the first surface so that it can slide over it. While the first surface takes up the entire roof window, the second surface is arranged at least in partial areas of the roof window. The second surface is arranged so that it can move relative to the first surface in such a way that the optical structures lying one over the other alter the incident light as a function of position.

20 Claims, 16 Drawing Sheets

FOREIGN PATENT DOCUMENTS

| | | | |
|---|---|---|---|
| JP | 62050222 | A | 3/1987 |
| JP | 401012403 | * | 1/1989 |
| JP | 6008730 | A | 1/1994 |
| JP | 10226228 | A | 8/1998 |
| JP | 11078523 | A | 3/1999 |

OTHER PUBLICATIONS

German Patent Office, German Search Report for German Application No. 102009049114.7, Jun. 30, 2010.

* cited by examiner

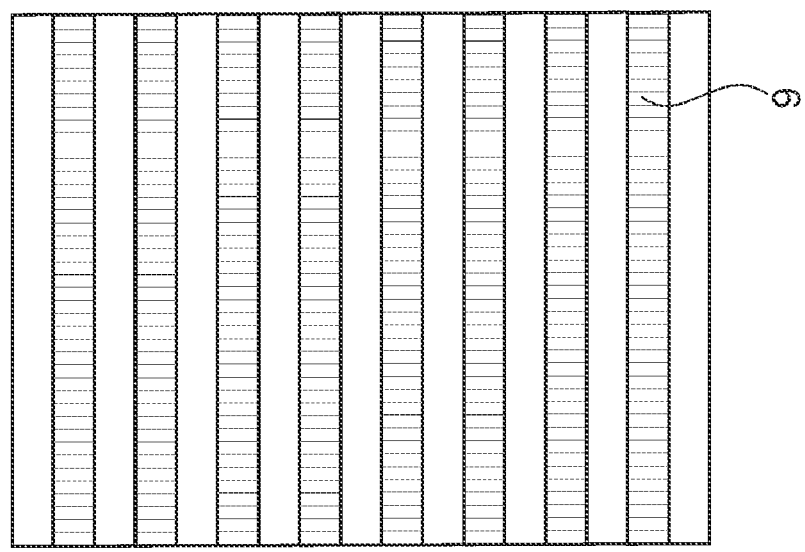
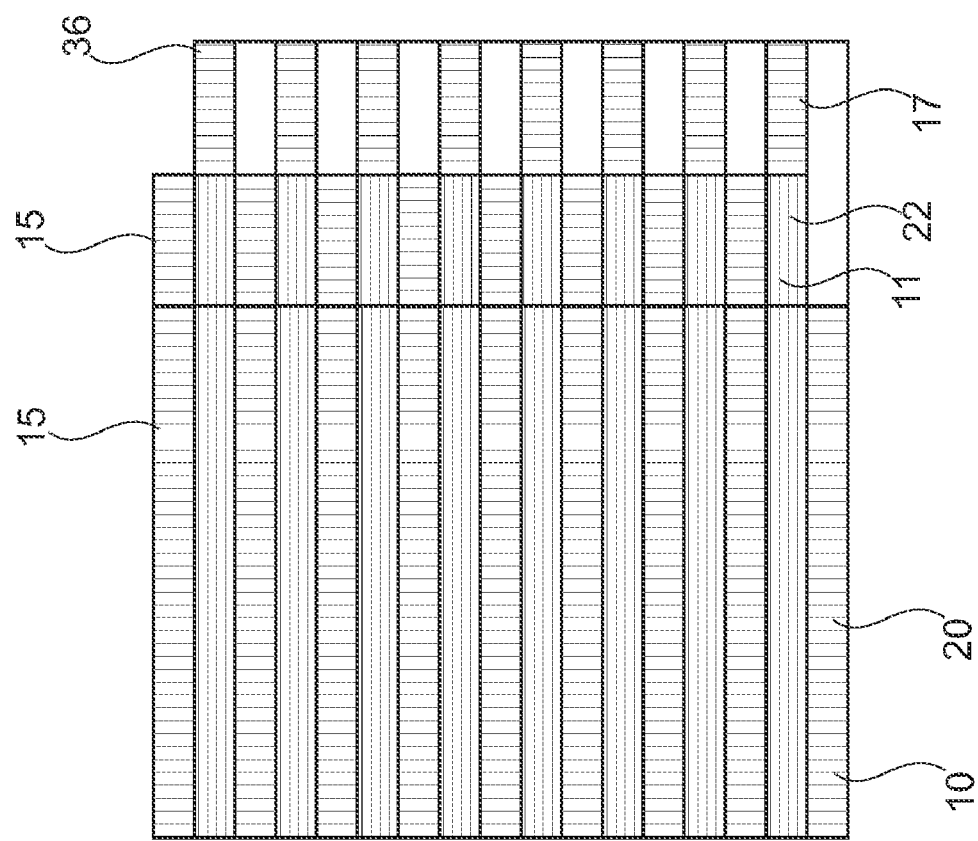

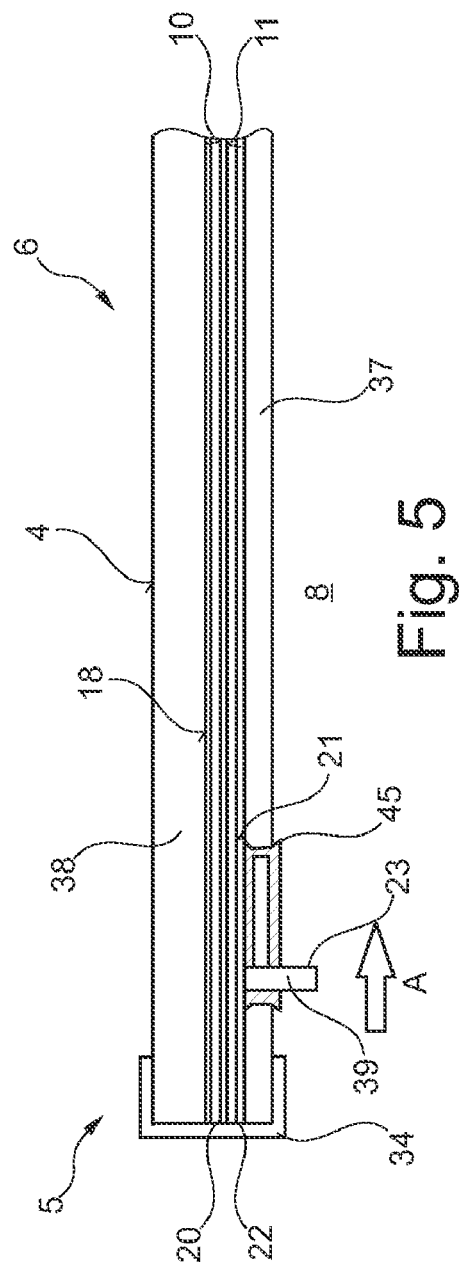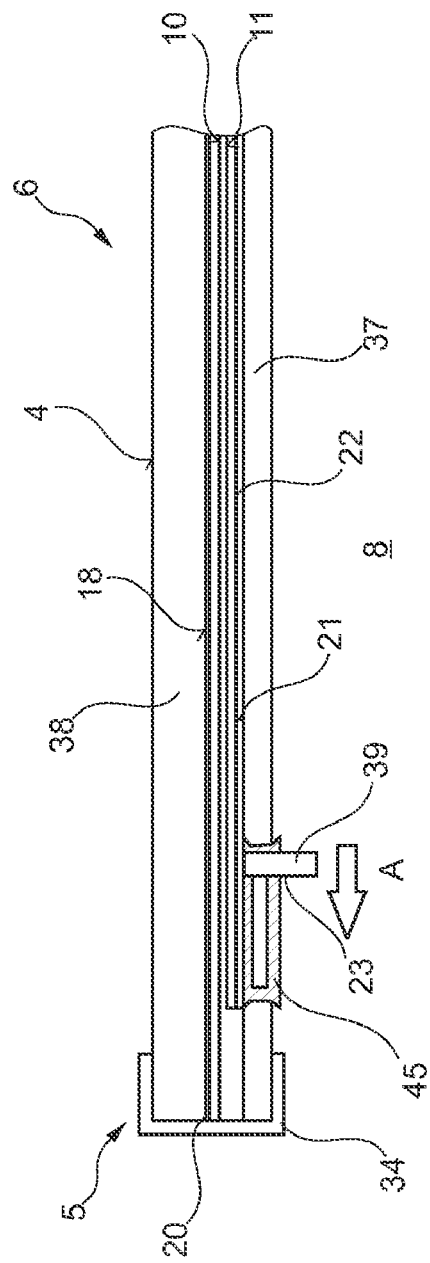

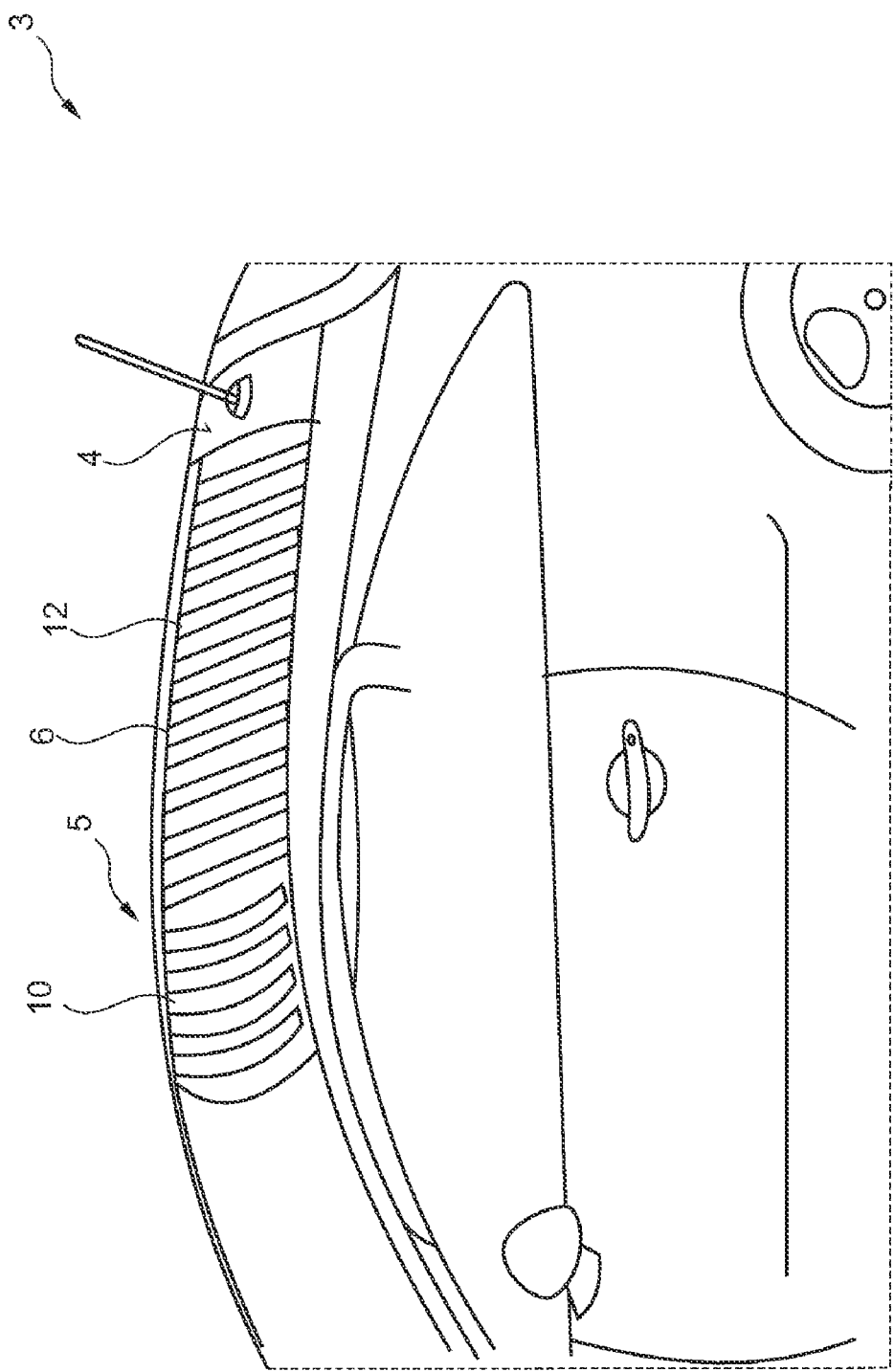

Section A-A

Section C - C

VEHICLE WITH TRANSPARENT ROOF AREA

CROSS-REFERENCE TO RELATED APPLICATION

This application claims priority to German Patent Application No. 102009049114.7, filed Oct. 12, 2009, which is incorporated herein by reference in its entirety.

TECHNICAL FIELD

The technical field relates to a vehicle with transparent roof area, which has at least one roof window tailored to the roof structure. An adjustable shade against exposure to incident light is provided toward the passenger compartment.

BACKGROUND

Such shades in a roof window toward the passenger compartment are achieved in prior art by means of Venetian blinds, which were partially or completely slid or pulled under the roof window. Such shades are intended to protect the interior compartment and passengers against exposure to rays, in particular rays of heat, and unburden the air conditioning system in hot months of the year. The operation and installation of the Venetian blinds are here complicated, as well as maintenance and cost intensive.

At least one object of the invention is to provide a flat shade tailored to the window that can be gradually adjusted to the incident rays of light and heat. In addition, other objects, desirable features, and characteristics will become apparent from the subsequent summary and detailed description, and the appended claims, taken in conjunction with the accompanying drawings and this background.

SUMMARY

A vehicle is provided with transparent roof area having at least one roof window tailored to the roof structure. An adjustable shade against exposure to incident light is provided toward the passenger compartment. The roof area has a first optically structured, fixed surface and a second optically structured, moving surface. The first and second surfaces are situated one over the other. The second surface here abuts the first surface so that it can slide over it. While the first surface takes up the entire roof window, the second surface is arranged at least in partial areas of the roof window. The second surface is arranged so that it can move relative to the first surface in such a way that the optical structures lying one over the other alter the incident light as a function of position.

Therefore, a first embodiment of the invention provides that the first structured surface have a stripe pattern that diminishes the transmission of the roof window. For example, this stripe pattern can be applied as a coating via screen printing to the surface of the roof window directed toward the passenger compartment. The second structured surface also has a stripe pattern, which is applied to a movable film, wherein the stripe pattern of the second surface corresponds to the first structured surface.

The stripe patterns of the second movable film gradually darken the gaps between the stripes of the first stripe pattern as the movable film is shifted. Toward the passenger compartment, the second surface with its stripe pattern is arranged so that it can slide relative to the first surface on the fixed roof window surface with stripe coating, wherein the two surfaces come into contact with each other. This advantageously makes it possible for the roof window to provide a shield against the rays of light and heat in the passenger compartment in such a way that the passenger compartment heats up to less of an extent during the hot months of the year, placing less of a load on the air conditioner, can be used more energy efficiently.

In another embodiment of the invention, the first optically structured surface is a checkered spot pattern, which diminishes the transmission of the roof window, and the second structured surface is a spot pattern corresponding to the spot pattern of the first structured surface. In this case, the gaps between the spots can be gradually darkened by sliding a second film with the optically structured surface of a checkered spot pattern until such time as the vehicle interior is protected against elevated exposure to rays of heat and light.

While the patterns of both the first optically structured surface and the second optically structured surface applied in a screen printing process are visible and recognizable to the vehicle passengers, the first surface can exhibit a structured polarization pattern in another embodiment of the invention. Such optical polarization grids are so finely structured that while the roof window transmission is impaired, it is barely discernible to the human eye.

If the second optically structured surface now has an identical polarization pattern, the roof window appears to be transparent and clear, thereby allowing the vehicle passengers see through the roof window unimpeded. However, if the two polarization patterns are only slightly shifted toward each other, the incident light in the vehicle interior is diminished to a point where the roof window is extremely shadowed or darkened when both polarization planes of the polarization patters completely cover each other in opposite directions.

Such structured polarization patterns can be striped and/or checkered, and have the same effect as the embodiment of the invention already described for screen-printing coated films or surfaces with coating. The advantage relative to the embodiment described above lies in the fact that such optically structured patterns can be transparent, wherein nearly all details can be discerned through the roof window, and the roof window is incrementally darkened only when the polarization patterns are shifted toward each other. Once the complete overlap has been exceeded, the roof window again becomes increasingly transparent.

Such mutually shiftable films with correspondingly structured polarization patterns can in principle also be provided for the rear window, side windows and front window, and when driving at night offer the advantage of diminishing the blinding effect of oncoming or passing vehicles.

Instead of a structured polarization pattern, it is also possible to provide a uniform polarization pattern for the first structured surface, which impairs the transmission of the roof window, and give the second structured surface a polarization pattern that corresponds to the polarization pattern of the first structured surface. Only when the second surface is turned relative to the first surface is the roof window darkened, depending on how the optically structured surfaces are turned relative to each other. To this end, the second optically structured surface is arranged on a disk-shaped film, which can rotate around its midpoint. As a result, depending on the size of the roof window, two or more persons can be individually protected against direct exposure to light and heat rays by turning the second film.

Instead of preparing the inner surface of an outer roof window pane, for example via coating, a fixed film with the corresponding optically structured surface can also be arranged under the roof window, and interact with a movable film, wherein this second film is held in position by means of a roof window pane situated on the inside. The gap between an outer and inner pane of the roof window must be large enough to allow the second film to slide relative to the first film in the gap.

To this end, the two panes can be encompassed by an extruded profile, and accommodated by the roof structure of the vehicle. In order to access the film to be moved, the inner pane can have an opening through which an operating pin extends up to the movable film, so as to move the latter relative to the fixed film until such point as the roof window becomes extremely darkened. To this end, a sliding mechanism can move the second film on a clip with latching points, or the second surface with the second film can be moved by way of electronically operated kinematics. It is also possible to couple the electronically operated kinematics with a device for acquiring the vehicle passenger compartment temperature in such a way that darkening occurs automatically given an increase in the acquired interior temperature.

Instead of a second inner pane on the roof window, it is also possible to support the second film by at least one roof arch in the roof area of the vehicle. Such a roof arch can have a latching device, so that it can be easily latched into the roof structure. In order to turn the polarization planes against each other, the second film can interact with a turning mechanism, which can be turned from the passenger compartment manually or via an electric drive.

The polarization planes can be equipped with other films or a stack of films with optically structured surfaces arranged one over the other, thereby enabling other darkening patterns for increasing the comfort of the passengers. For this purpose, three optical surfaces are arranged one over the other in another embodiment of the invention, wherein the first and second surfaces are provided with a polarization pattern with an identical structure, while only half of the third surface is provided with a striped polarization pattern, so that, in addition to a transparency reflecting this striped form, the roof window can be half darkened to fully darkened by the two first films.

BRIEF DESCRIPTION OF THE DRAWINGS

The present invention will hereinafter be described in conjunction with the following drawing figures, wherein like numerals denote like elements.

FIG. 4 shows a diagrammatic view of three overlapping films with different polarization patterns, which only act to partially darken a roof window;

FIG. 5 shows a diagrammatic cross section through a roof window with polarization films in a light-permeable position;

FIG. 6 shows a diagrammatic cross section through the roof window with polarization films in a darkening position;

FIG. 15 shows a diagrammatic view of a roof area of a vehicle according to a third embodiment of the invention;

DETAILED DESCRIPTION

The following detailed description is merely exemplary in nature and is not intended to limit the application and uses. Furthermore, there is no intention to be bound by any theory presented in the preceding background or summary or the following detailed description.

Figure 1:
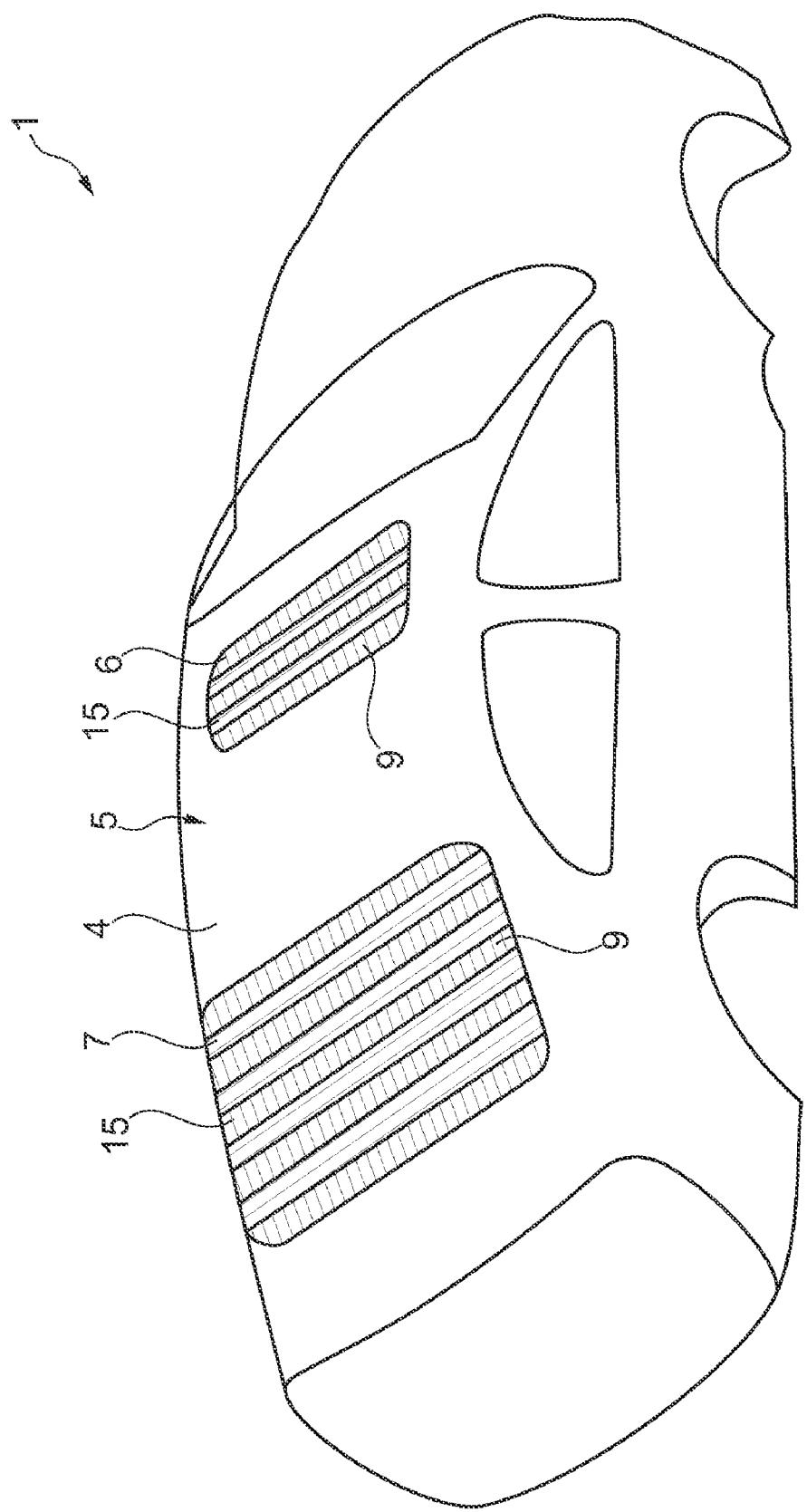
FIG. 1 shows a diagrammatic view of a roof area of a vehicle according to a first embodiment of the invention.

FIG. 1 shows a diagrammatic view of a roof area 4 of a vehicle 1 according to a first embodiment of the invention. In this embodiment of the invention, the roof area 4 has a roof window 6 and a rear window 7. In order to protect the passengers of the vehicle against exposure to rays of heat and light, the roof window 6 and rear window 7 can be gradually shaded or darkened. In comparison to known sun blinds and sunshades, which can only be closed entirely or partially, this roof structure 5 with the roof window 6 and rear window 7 has an optical structure that is barely discernible to the eye of the passengers, which enables a continuous adjustment of light permeability. In this first embodiment, this darkening option is based on arranging films with a striped, structured polarization pattern one over the other.

The polarized stripes are of the same width, with each second stripe being polarized offset by 90°. In this case, the first film is immovably fixed in place, while the second film can be shifted by the measure of the stripe width. To allow the second film to be shifted, the second film can be shorter or wider than the first film by the width of a stripe. In a base position, the stripes of both films overlap in the identical polarization direction. As a result, light can penetrate through the films. However, shifting the second film relative to the first film causes stripes of varying polarization direction to lie over each other. The light is blocked off in these areas. Shifting the second film by a full stripe width so that differently polarized stripes come to lie over each other causes the entire surface of the roof window 6 or rear window 7 to darken.

Gradually shifting the second film relative to the first film initially gives rise to narrow, darkened stripes that become wider and wider, depending on the shifting path traversed. The wider the darkened stripes, the narrower the transparent areas, so that shadowing or darkening increases. Another effect can be achieved by using a third film. While the first two films are in their initial position and lie over each other with the same polarization, the third film can also lie in the initial position, so that identical polarization stripes come to lie over each other here as well. As a result, despite the three polarized films, the entire surface appears to be permeable to light.

However, now shifting the third film by itself initiates a darkening for each second stripe. In an end position, a transparent stripe ends up switching with a non-transparent stripe. Another potential variation involves turning the polarization pattern by up to approximately 90°, wherein this approximately 90° turn yields a complete darkening. At angles less or greater than approximately 90°, a residual light can pass through the films, even though the stripes lay congruently one over the other. Such polarized films can be used for all areas of sunroofs that are either rigidly bonded, detachable, slidable or erectable. In addition, it is also possible to provide the side panes and front pane with polarized films of this kind, wherein the key aspect with respect to the front pane is that the blinding effect caused by oncoming vehicles at night be diminished with a single, fixed film already, thereby increasing driving safety or reducing the risk of accident.

The following figures will now explain various details of the invention in greater detail. Components with the same functions will be labeled with the identical reference numbers for all ensuing figures, and not discussed any further.

Figure 2C:
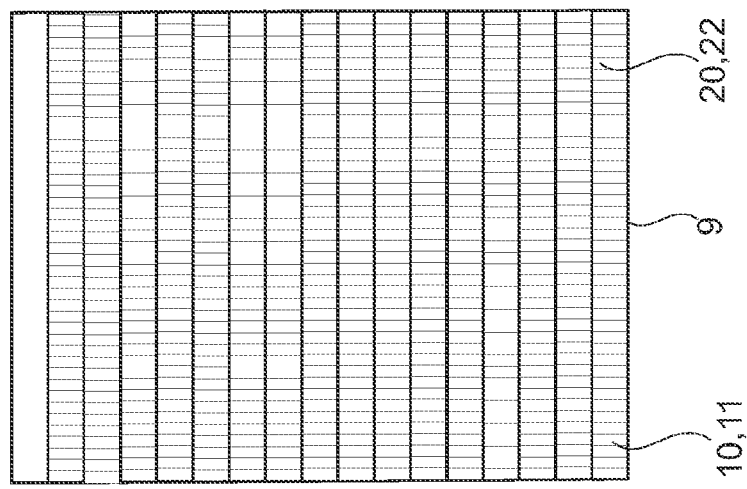
FIG. 2 shows diagrammatically structured polarization patterns, which are arranged one over the other and act to darken a roof window.
Figure 2B:
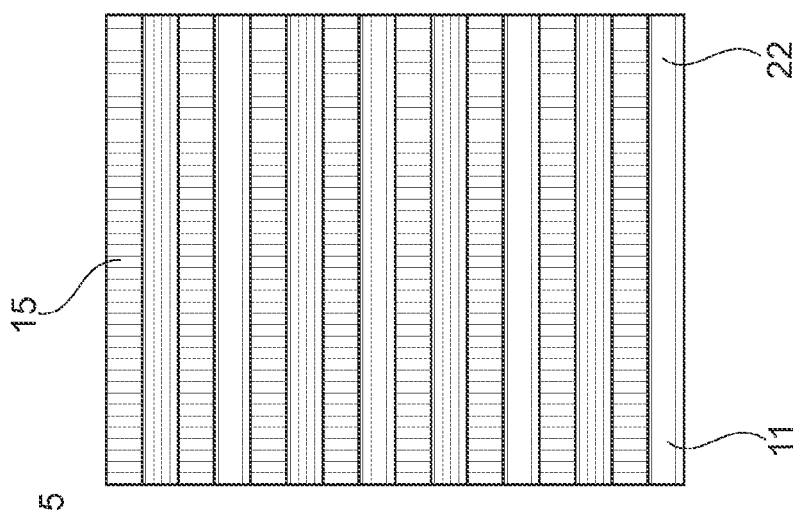
Figure 2A:
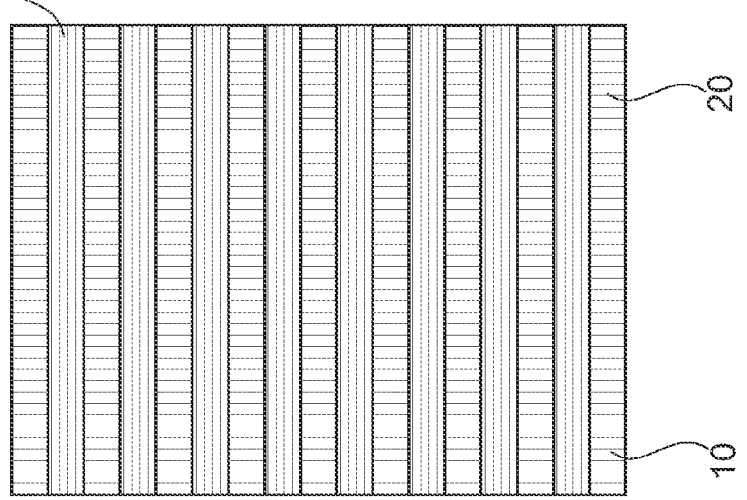

FIG. 2A, FIG. 2B and FIG. 2C show structured polarization patterns, which are arranged one over the other, and darken a roof window. FIG. 2A here provides a polarization film that has striped polarization grids varyingly shifted by approximately 90° relative to each other on a first surface 10, wherein this film 20 is installed in the roof area or rear area as an immovably fixed film 20, as illustrated on FIG. 1.

FIG. 2B shows the same striped structure as FIG. 1*a* on an optically structured second surface 11 with a structured polarization pattern 15 of a second film 22. In this example for an embodiment of darkening, the immovably fixed film 20 shown on FIG. 2A is shifted by precisely one stripe width relative to the slidably arranged film 22. so that a roof window area in which the first and second optically structured surface 10 and 11 come to lie one over the other experiences maximum darkening 9, as illustrated on FIG. 2C.

As shown on FIG. 2C, constructing the second, slidable film 22 one stripe width shorter to enable a shifting within the area provided for the film 1A yields a transparent stripe in an edge area of the darkened window. This can be avoided by having the sliding area be larger than the area of the immovably fixed first film 20. In this case, the second film 22 shown on FIG. 2B would be one stripe width longer than the first film 20 depicted on FIG. 2A.

Figure 3C:
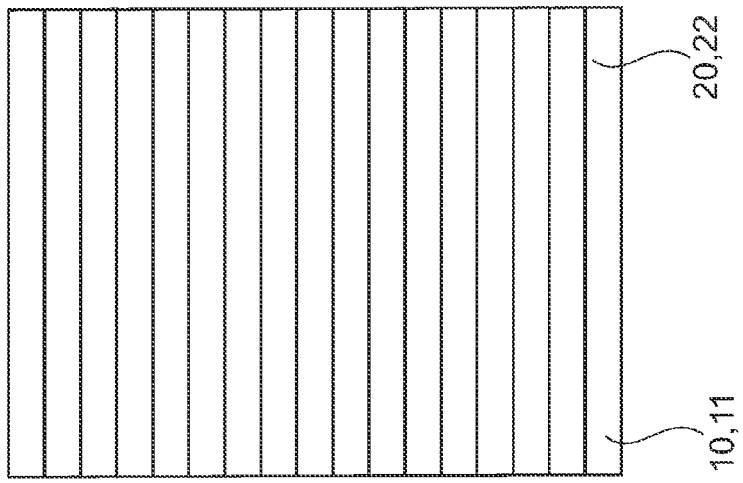
FIG. 3 shows diagrammatically structured polarization patterns, which are arranged one over the other and make it possible to see through a roof window.
Figure 3B:
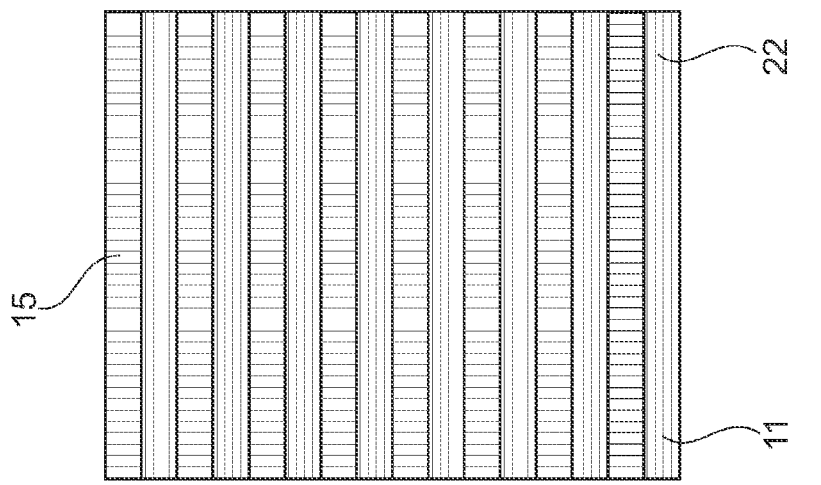
Figure 3A:
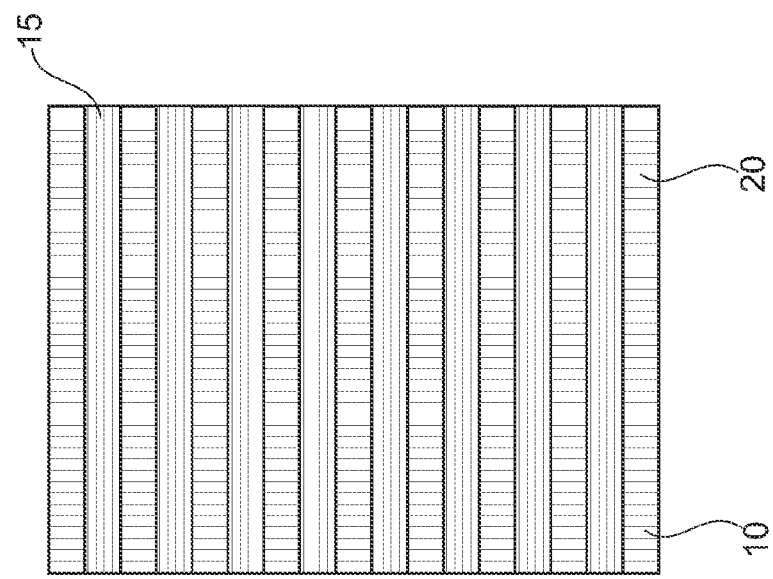

FIG. 3A of FIG. 3 shows an immovably fixed film with the structured polarization pattern 15, as on FIG. 2A. However, FIG. 3B shows the movable film 22, which is shifted relative to FIG. 2B by one stripe width. The films 20 and 22 are arranged one over the other on FIG. 3C, and ensure a nearly unhindered view through the roof window, since the two films 20 and 22 with their optically structured surfaces 10 and 11 and their identically structured and identically aligned polarization patterns 15 lie one over the other, and enable a complete view through the window areas.

FIG. 4A and FIG. 4B show a superposition of three film s 20, 22 and 36 with varying polarization patterns, which partially darken a roof window when the first two films 20 and 22 with their optically structured surfaces 10 and 11 come to lie over each other in their base position, and a third film 36 with only half the polarization stripes is shifted to such an extent that, as depicted here, for example, half of the stripes are dark, while the other half remains transparent, as shown on FIG. 4B.

FIG. 5 shows a diagrammatic cross section through a roof window 6 in a light-permeable position of the optically structured surfaces 10 and 11 lying one over the other, or of the immovably fixed film 20 below a surface 18 directed toward the passenger compartment, an outer roof window pane 38 and a film 22 that is situated under the immovably fixed film 20 and can shift in the direction of arrow A, with the structured polarization patterns of the kind shown on preceding FIG. 2A and FIG. 3A.

To this end, the two films are held by a second inner roof pane 37 arranged toward the passenger compartment 8, wherein the gap between the inner roof pane 37 and outer roof pane 38 must be enough to enable a sliding motion of the film s 20 and 22 toward each other. In order to shift the second film 22, this embodiment according to FIG. 5 provides a recess in the inner roof pane 37. The recess is sealed by means of a rubber frame 45. A handle 39 extends through the recess up to the movable film 22, and can be used to shift the film 22 by a maximum of the stripe width shown on the preceding figures.

FIG. 6 shows a diagrammatic cross section through the roof window 6 in a darkening position, wherein the second film 22 is shifted by a stripe width relative to the position on FIG. 5. To ensure that the outer roof pane 38 and inner roof pane 37 with the films 20 and 22 lying in between can be integrated into the roof structure, the roof window 6 has a frame made out of an extruded profile 34, which envelops the roof window 6.

A longitudinally striped polarization pattern can also be provided in place of a transversely striped polarization pattern, wherein the darkening maneuver can take place transverse to the travelling direction. As an alternative, a polarization pattern with a checkered structure can also be provided for the two films or two optically structured surfaces 10 and 11 lying one over the other.

Figure 7:
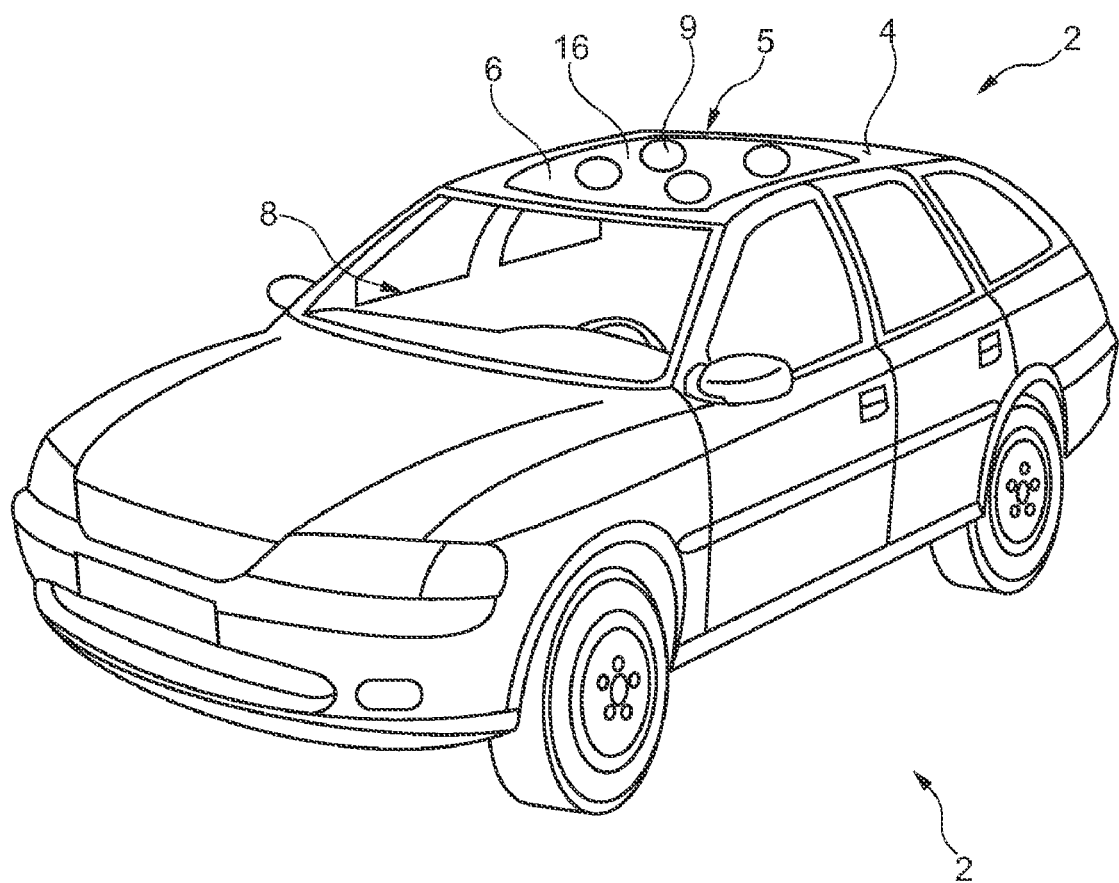
FIG. 7 shows a diagrammatic view of a vehicle according to a second embodiment of the invention.

FIG. 7 shows a diagrammatic view of a vehicle 2 according to a second embodiment of the invention. In this second embodiment of the invention, the passenger compartment 8 and its passengers are protected against excessive exposure to sunlight by a roof window 6 having four circular areas that can be individually darkened. Also provided in this case are films with polarization patterns of the kind described in more detail in the following figures.

Figure 8:
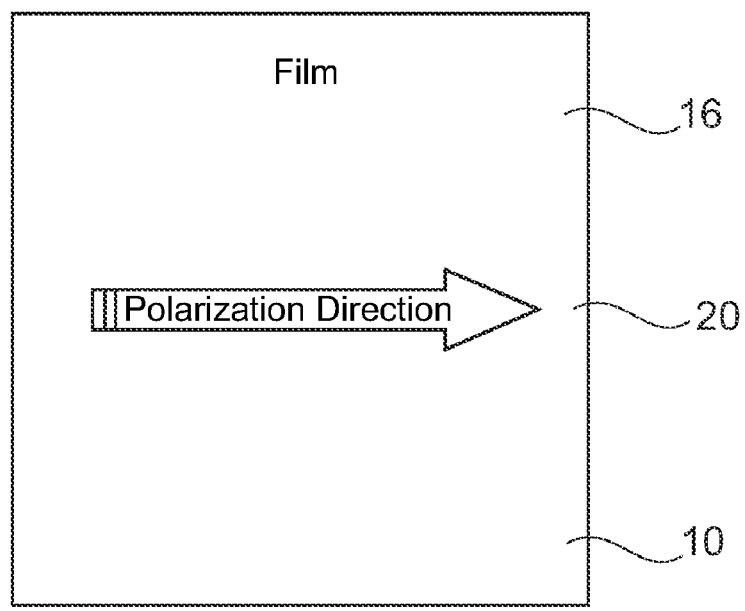
FIG. 8 shows a diagrammatic view of a roof window area with a fixed, uniform polarization pattern.

FIG. 8 shows a diagrammatic view of a roof window area with an immovably fixed, uniform polarization pattern 16, which has a polarization direction denoted by an arrow uniformly over the entire optically structured surface 10.

Figure 9:
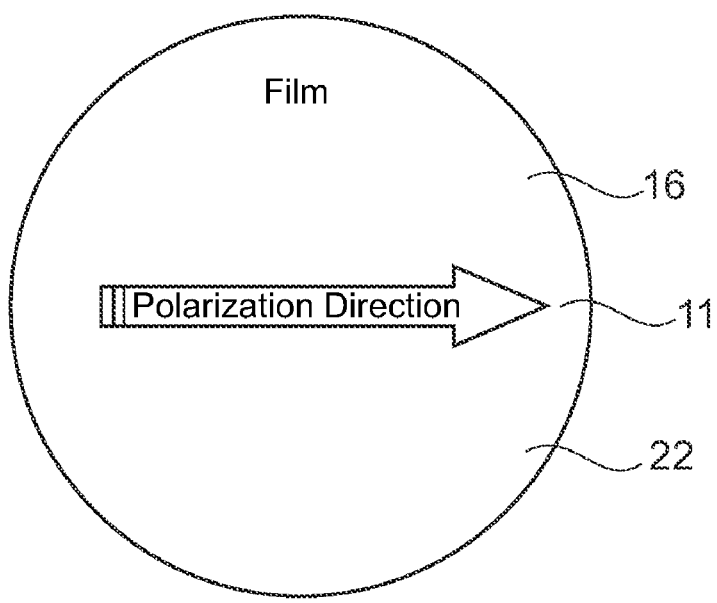
FIG. 9 shows a diagrammatic view of a rotatable film pane with a uniform polarization pattern.

FIG. 9 shows a diagrammatic view of a rotatable film pane with a uniform polarization pattern 16, wherein the arrow direction denotes the polarization direction of the second film 22 here as well.

Figure 10:
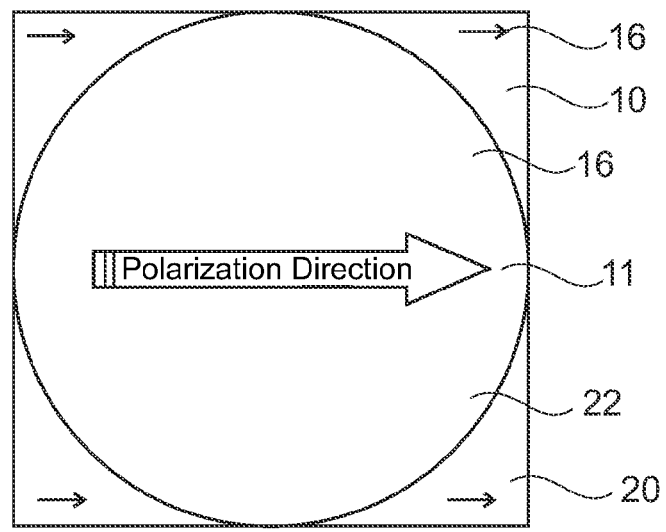
FIG. 10 shows a diagrammatic view of the films arranged one over the other according to FIG. 8 and FIG. 9 given the same polarization direction.

FIG. 10 shows a diagrammatic view of the films arranged one over the other according to FIGS. 8 and 9 given an identical polarization direction. A nearly perfectly transparent roof window surface here comes about, since both optically structured surfaces 10 and 11 with their uniform polarization patterns 16 are arranged in the same polarization direction.

Figure 11:
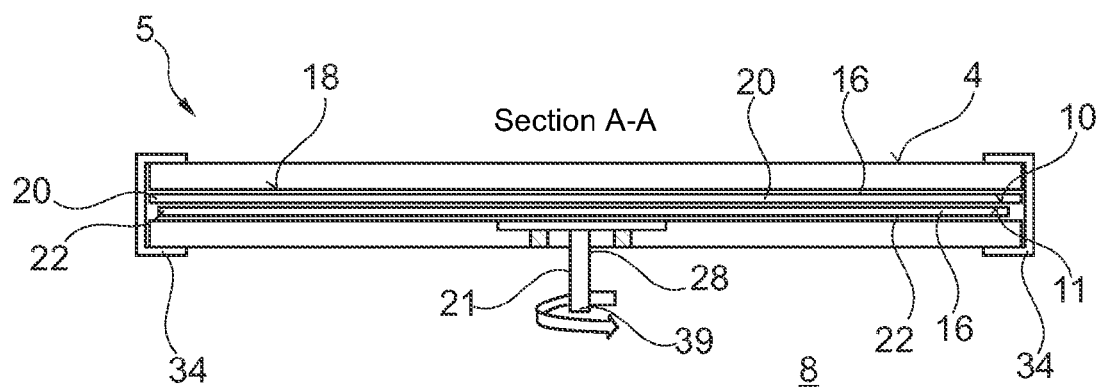
FIG. 11 shows a diagrammatic cross section through a roof window area with polarization films according to FIG. 8 and FIG. 9.
Figure 12:
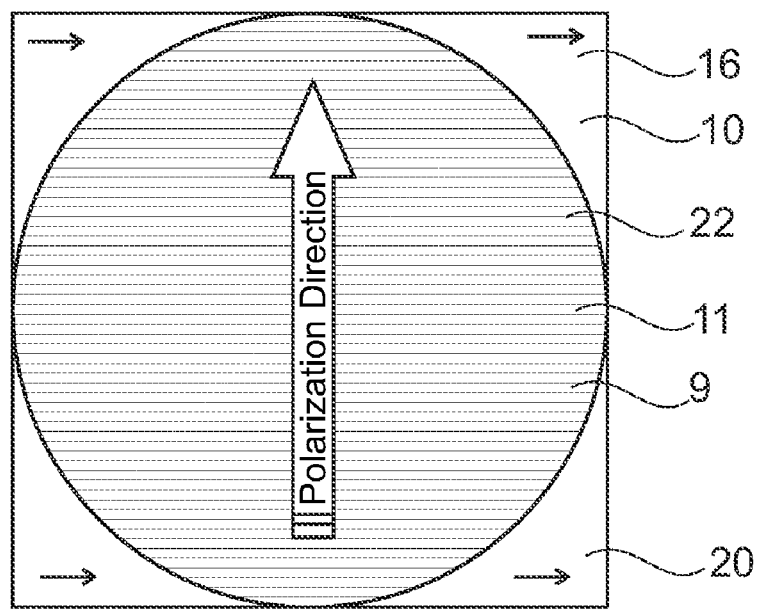
FIG. 12 shows a diagrammatic view of the films arranged one over the other according to FIG. 8 and FIG. 9 in polarization directions turned by approximately 90° relative to each other.

FIG. 11 shows a diagrammatic cross section through a roof window area with polarization films according to FIGS. 8 and 9, wherein this cross sectional drawing depicts the ability of the second film 22 to turn relative to the immovably fixed film 20 with the help of a turning mechanism 28 and handle 39. To this end, the turning mechanism is situated in the center of the disk-shaped film, and as shown on FIG. 10, permits the complete transparency of the roof window or, as shown by the ensuing FIG. 12, a maximum darkening in the area of the disk-shaped second film 22.

Figure 13:
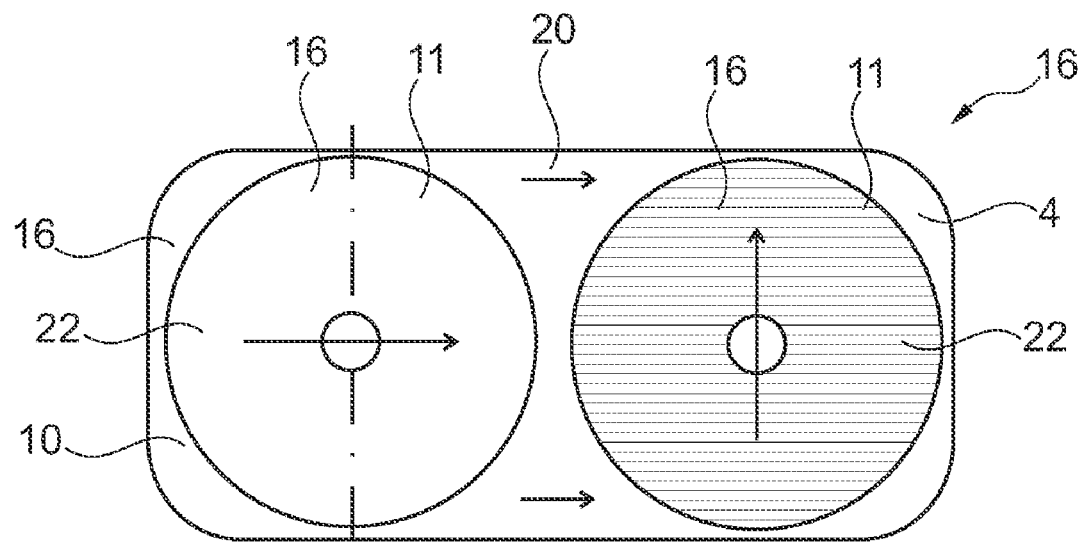
FIG. 13 shows a diagrammatic top view of a roof window with fixed polarization film and two polarized rotating panes.

FIG. 13 shows a roof window with two polarized rotating panes, which are arranged in varying polarization directions relative to the uniform polarization direction of the first film 20. The polarization directions are here denoted by corresponding arrows. This makes it possible to establish a sun shading setting for the passenger without it yet being effective for the driver in the roof window.

Figure 14:
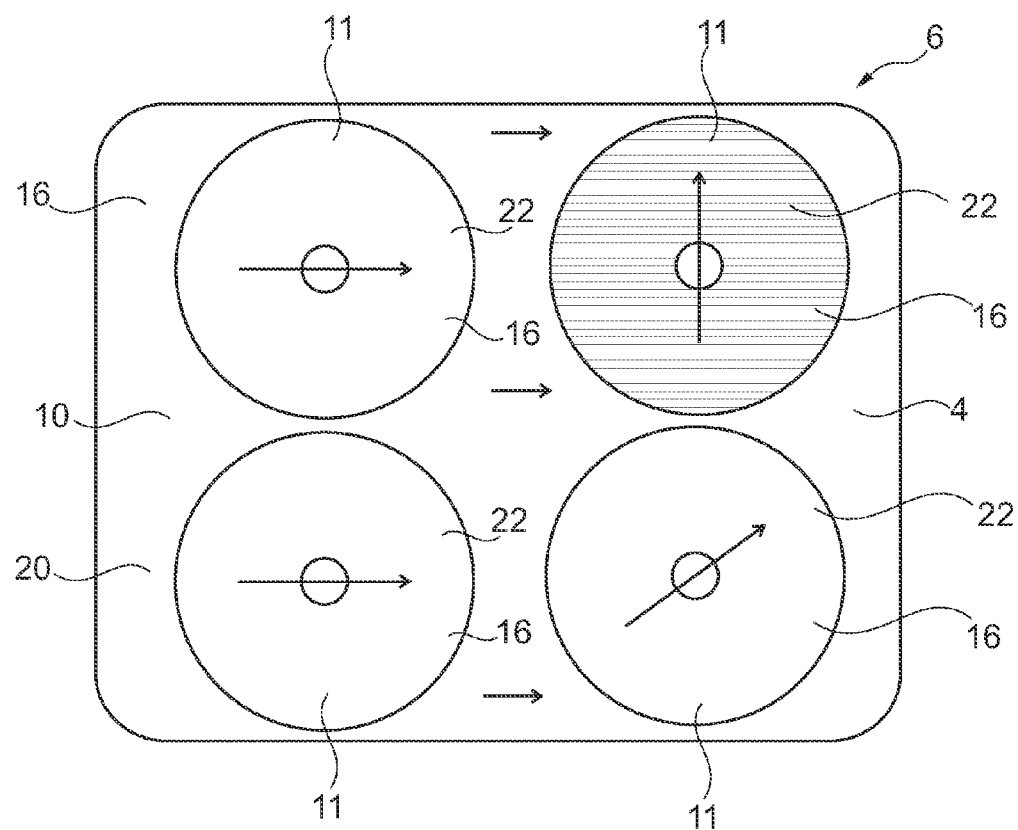
FIG. 14 shows a diagrammatic top view of a roof window with fixed polarization film and four polarized rotating panes.

FIG. 14 shows a roof window with four polarized rotating panes given a varying alignment of the polarization planes and directions. Here as well, the sunshade is only completely engaged or completely rotated in place for the passenger, while overlapping the polarization panes with the uniformly structured polarization patterns of the first immovably fixed film 20 of the roof window yields either a complete transparency or slightly diminished transparency in the other areas.

FIG. 15 shows a diagrammatic view of a roof area 4 of a vehicle 3 according to a third embodiment of the invention. Provided here for the roof window 6 are visible stripe patterns, which are rigidly secured with the outer pane of the roof window 6.

Figure 16C:
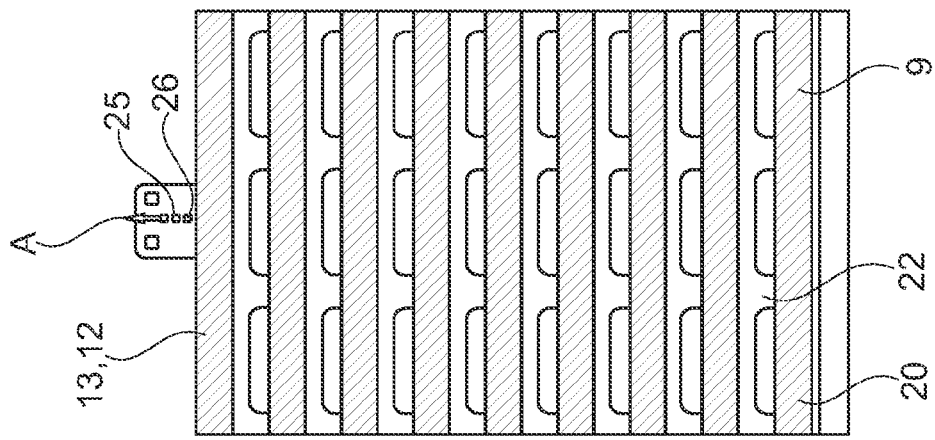
FIG. 16 shows diagrammatic views of films with optically structured surfaces.
Figure 16B:
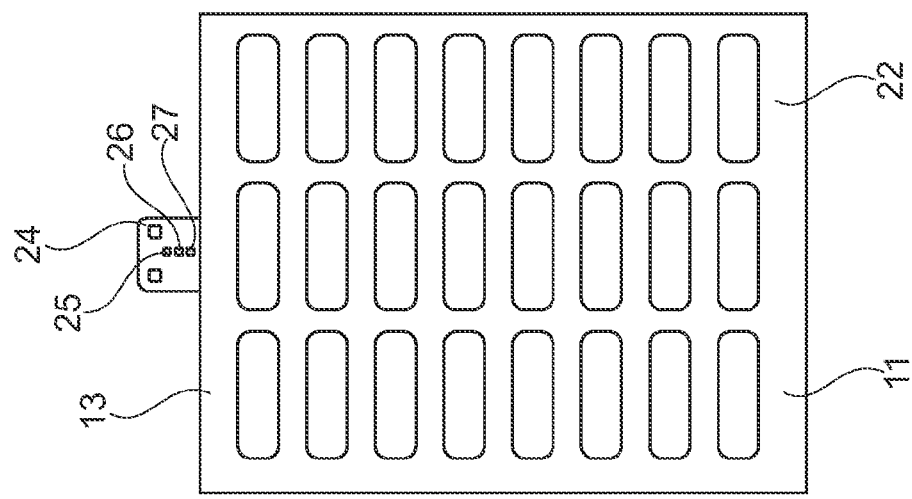
Figure 16A:
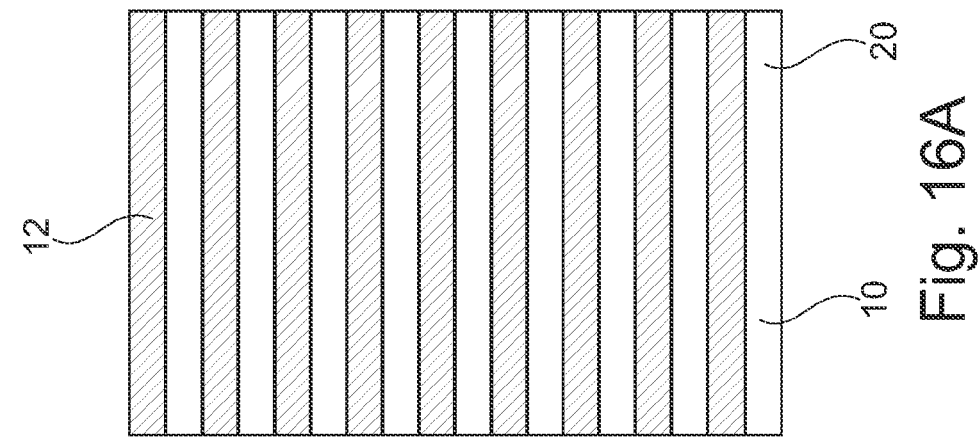

FIG. 16A to FIG. 16C show diagrammatic views of films with optically structured surfaces 10 and 11. To this end, FIG. 16A depicts an example of a striped pattern 12 of a first film 20 with an optically structured surface 10, for example applied by means of screen printing, wherein the stripe pattern 12 provides smooth stripes. Instead of these smooth stripes, use can also be made of a spot pattern of a kind resembling a checkered pattern for the first film 20.

FIG. 16B shows a movable second film 22 with a second optically structured surface 11, wherein the stripe width is here also retained for a second stripe pattern 13, but continuous coverings are provided in the longitudinal direction of the film in both the edge area and in two areas in the central region, which are coated to absorb light by means of screen printing. Secured at the upper edge of the second film 22 is a clip 24, which has several latching settings, e.g., 25, 26, 27, so that the second movable film 22 can be incrementally shifted relative to the first film 20.

FIG. 16C now shows the two superposed, optically structured surfaces 10 and 11 with the films 20 and 22 and their striped patterns 12 and 13, wherein it illustrates a partial darkening of the gaps of the first stripe pattern 12 via the second stripe pattern 13 achieved by shifting the second film 22 relative to the first film 20 in the direction of arrow A.

Figure 17:
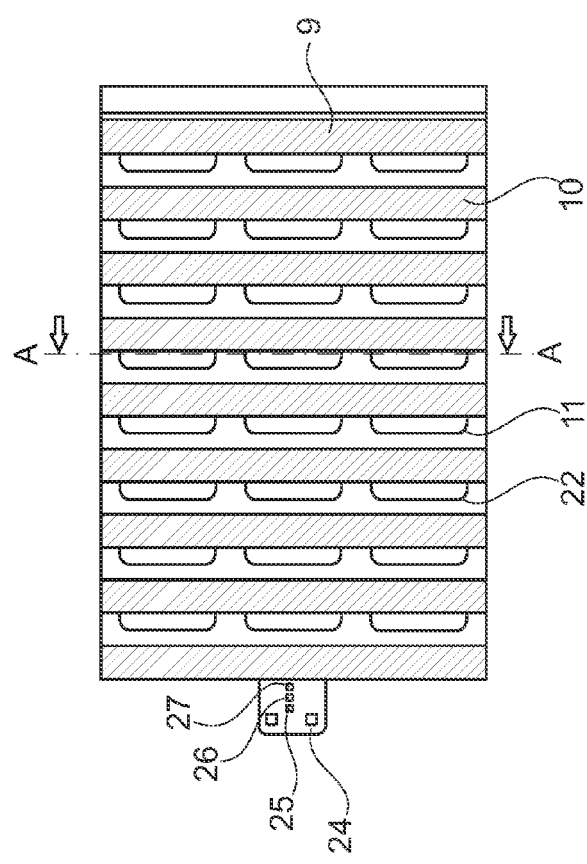
FIG. 17 shows a diagrammatic view of films arranged one over the other with optically structured surfaces.

FIG. 17 shows a diagrammatic view of optically structured surfaces 10 and 11 lying over each other, which are already known from FIG. 16C. FIG. 17 shows an intersecting plane A-A, which will now be explained in greater detail based on FIG. 18.

Figure 18:
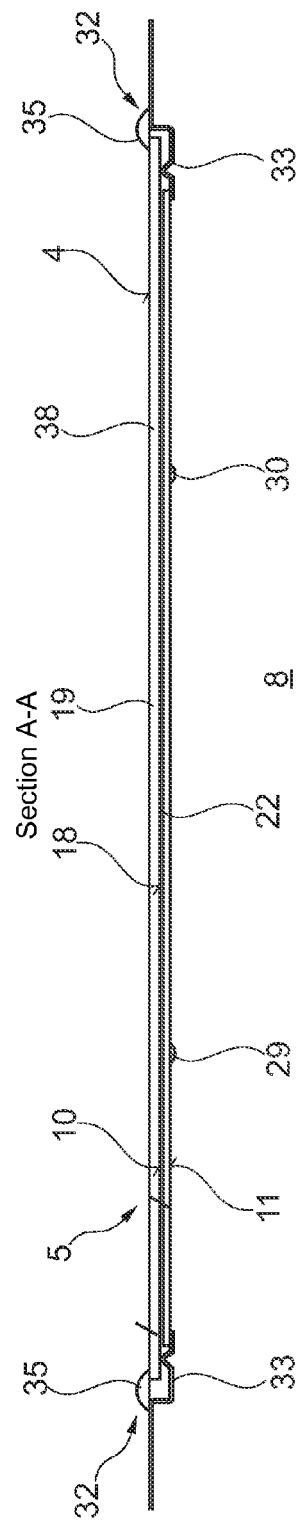
FIG. 18 shows a diagrammatic cross section through a roof structure along the intersecting line A-A on FIG. 17.

FIG. 18 shows a diagrammatic cross section through a roof structure along the intersecting line A-A of FIG. 17. To this end, the roof with the roof structure 5 incorporates a section enveloped by a carrier flange 33. Secured and glued to this carrier flange 33 is a roof pane 38 that covers the section, and sealed with a profile rubber 35 in the area of the carrier flange 32.

The carrier flange 33 not only bears the outer roof pane 38 on a bead, but also the movable film 22 in a lowered area 40. An immovably fixed film is not provided in this solution, but rather a coating of the surface 18 of the outer roof pane 38 arranged toward the passenger compartment 8. As a result, all that need be done is to hold the movable film in such a way that the optically structured surfaces 10 and 11 of the upper side 18 and movable film 22 lie one over the other. To this end, the movable film 22 is protected by two roof arches 29 and 30, which are arranged under the film 22 in the roof window area.

Figure 19:
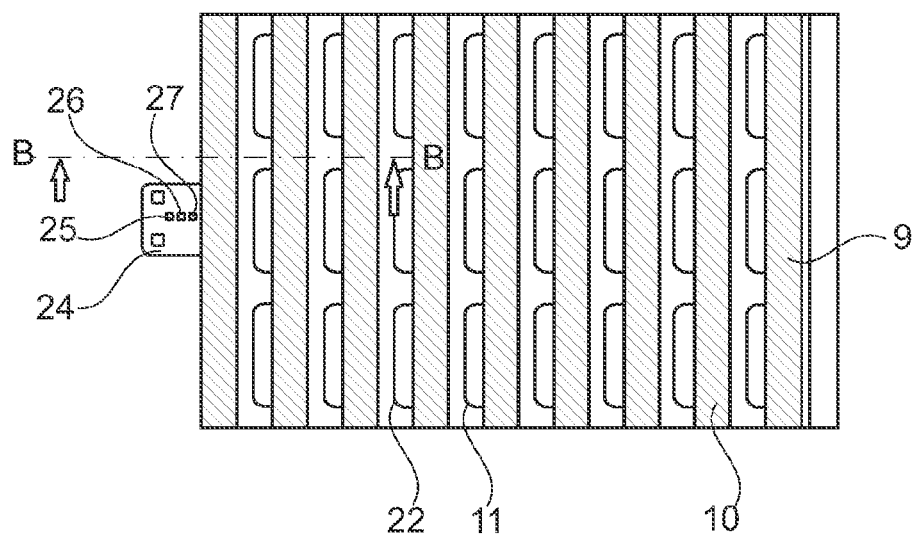
FIG. 19 shows a diagrammatic view of films arranged one over the other with optically structured surfaces.

FIG. 19 shows a diagrammatic view of optically structured surfaces 10 and 11, wherein this top view presents an intersecting line B-B that is described in greater detail in the following FIG. 20.

Figure 20:
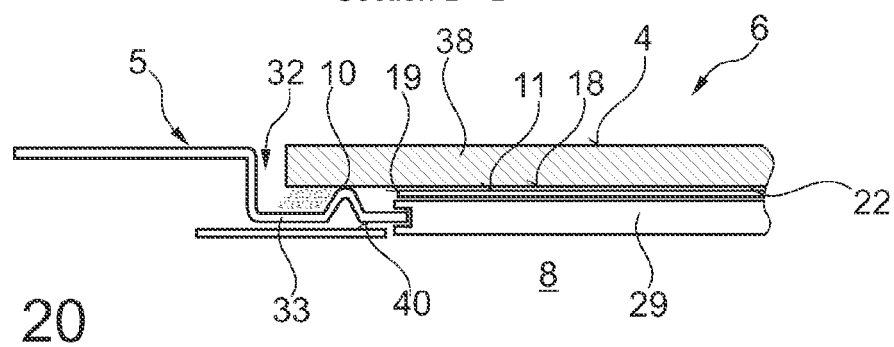
FIG. 20 shows a diagrammatic cross section through a roof window along the intersecting line B-B on FIG. 19.

FIG. 20 shows a diagrammatic cross section through a roof window 6 along the intersecting line B-B of FIG. 19. Clearly visible in this cross sectional drawing is the roof structure 5 with the carrier flange 33, wherein a roof arch 29 is latched into a recess of the carrier flange 33. Arranged between the roof arch 29 and outer roof window 38 is a movable film 22, the optically structured surface 11 of which interacts with an optically structured coating of the surface 18 of the outer pane 38 oriented toward the passenger compartment 8. The roof arch 29 will be described in more detail in the following FIG. 21.

Figure 21:
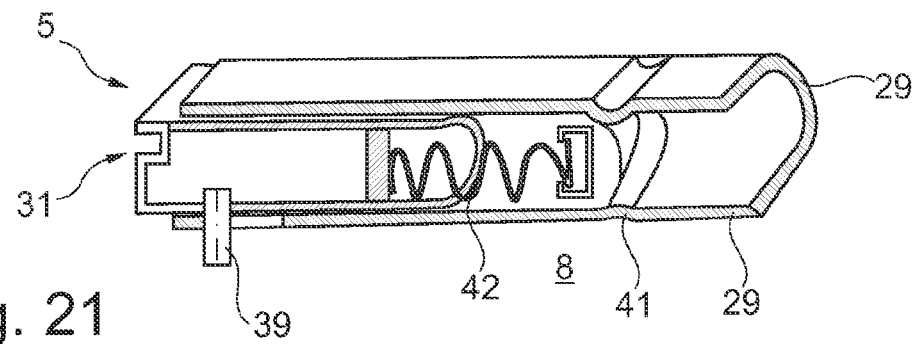
FIG. 21 shows a diagrammatic depiction of a partially perspective cross sectional view of a roof arch.

FIG. 21 shows a partially perspective cross sectional view of a roof arch 29. To this end, the end of the roof arch 29 shown here exhibits a bead 41, against which a spring 42 abuts. This spring 42 presses a piston 43 out of an end area of the roof arch 29, wherein the face of the piston 43 has a latching mechanism 31, with which the roof arch 29 can latch into the depression of the carrier flange 33 depicted on FIG. 20. For this purpose, the piston 43 is provided with a handle 39, with which the piston 43 can be pressed back into the roof arch 29 against the pre-stress of the spring, so as to fix the roof arch in place under the second film in the carrier flange of the roof structure 5.

Figure 22:
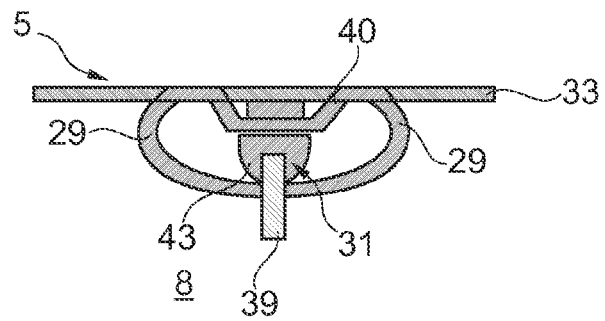
FIG. 22 shows a diagrammatic view of a downwardly moved region of a roof flange for latching a roof arch.

FIG. 22 shows a downwardly moved area 40 of the carrier flange 33 of the roof structure 5 into which the latching mechanism 31 of the roof arch 29 latches as soon as the handle 39 pulls back the piston 43, causing it to latch into the downwardly moved area 40 of the carrier flange 33.

Figure 23:
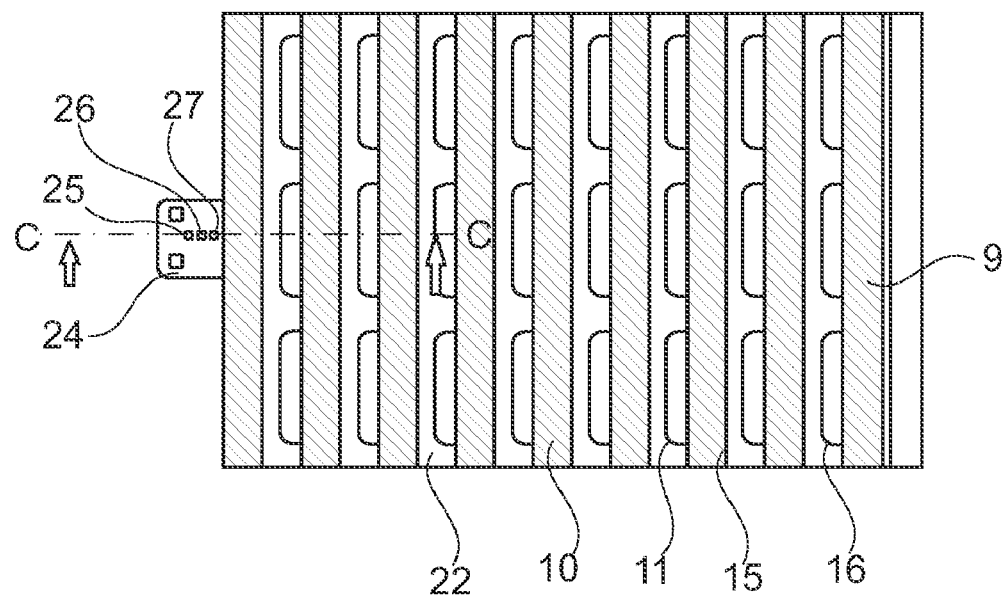
FIG. 23 shows a diagrammatic view of films arranged one over the other with optically structured surfaces.

FIG. 23 shows a diagrammatic view of optically structured surfaces 10 and 11 situated one over the other, wherein the intersecting line C-C depicts a section through the clip 24.

Figure 24:
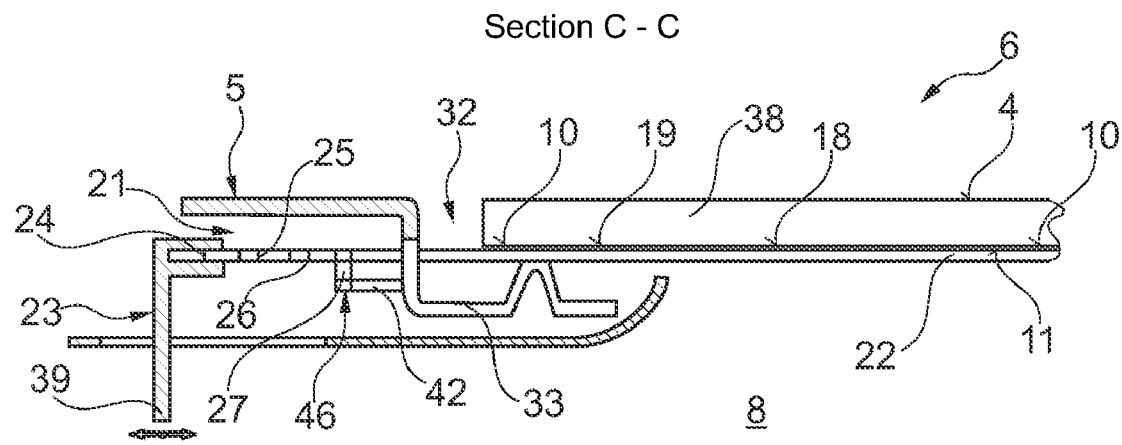
FIG. 24 shows a diagrammatic cross section through a roof structure along the intersecting line C-C on FIG. 23 of a darkenable roof window.

FIG. 24 shows a diagrammatic cross section through a roof structure along the intersecting line C-C of FIG. 23 of a darkenable roof window 6. Section C-C provides a detailed view of the sliding mechanism for the slidable film 22 relative to the optically structured surface 10 on the surface 18 of the outer roof pane 38. In addition, the handle 39 can be used to move the clip 24 in the direction of arrow A.

To this end, the latching mechanism 46 has a pre-stressed, spring-mounted snap hook 44, which can snap into the individual latching settings 25, 26 and 27 of the clip 24. Also possible in place of a manual sliding mechanism 23 are electrically operated kinematics 21, for example potentially coupled with a temperature sensor, so as to automatically fade out the rays of heat passing through the roof window 6 given an elevated temperature in the passenger compartment 8.

Figure 25:
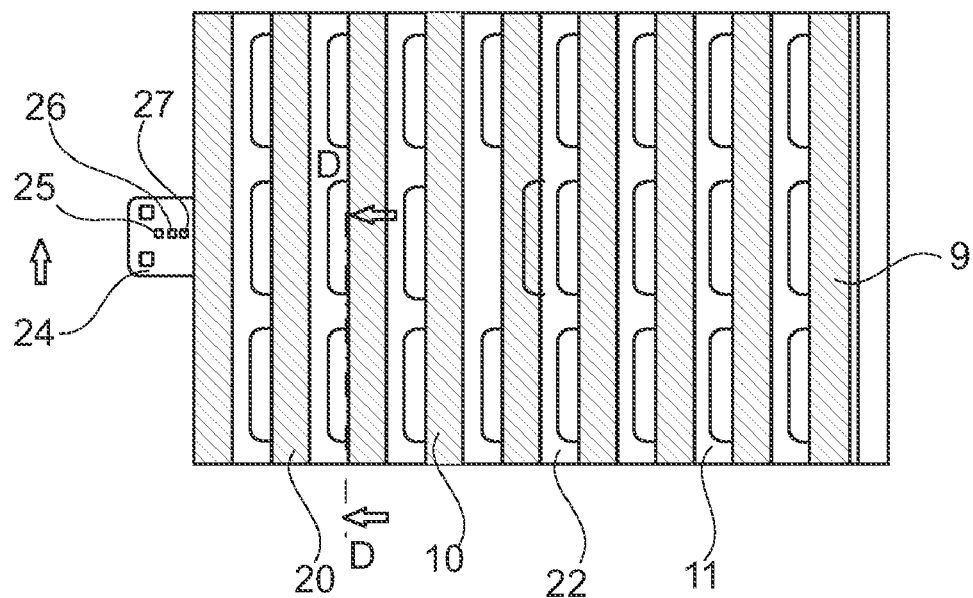
FIG. 25 shows a diagrammatic view of films arranged one over the other with optically structured surfaces.

FIG. 25 shows a diagrammatic view of films 20 and 22 with optically structured surfaces 10 and 11 arranged one over the other. In this case, FIG. 25 depicts an intersecting line D-D, which will be described in greater detail in the following FIG. 26.

Figure 26:
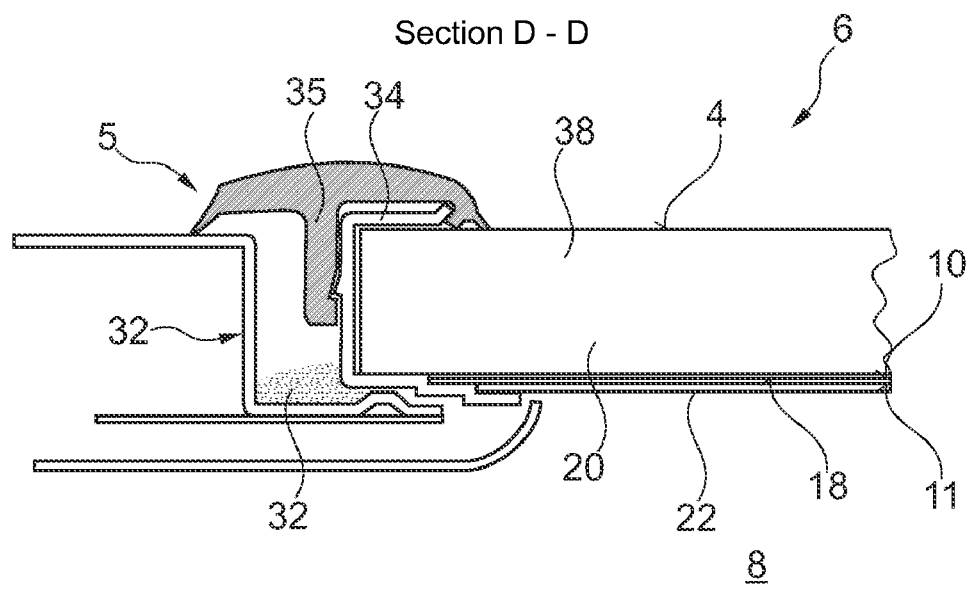
FIG. 26 shows a diagrammatic cross section through a roof structure along the intersecting line D-D on FIG. 23 of a darkenable roof window.

FIG. 26 shows a diagrammatic cross section through a roof structure 5 along the intersecting line D-D of FIG. 25 of a darkenable roof window 6. This embodiment of the invention again provides for two films 20 and 22, wherein a first film 20 is immovably fixed, and a second film 22 can move longitudinally relative to the first film. The films 20 and 22 and the outer roof window pane are held by an extruded aluminum profile 34 in the form of a frame. This frame can be blued into a correspondingly prepared carrier flange 33 of the roof structure 5, and the gap between the roof structure 5 and area of the carrier flange 32 can be sealed with a profile rubber 35, which can latch into a corresponding projection of the extruded aluminum profile 34. The rubber of the profile 34 can here simultaneously protect the extruded aluminum profile 34 against exposure to the weather as well. The two films 20 and 22 are encompassed by the extruded aluminum profile 34 toward the passenger compartment 8, and immovably fixed or longitudinally shiftable on the edges of the roof window 6, accordingly.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle having a transparent roof area comprising:
a roof structure;
a passenger compartment;
a roof window tailored to the roof structure including an outer window pane and an inner window pane; and
a roof area comprising a first surface that is selectively patterned and substantially immovably fixed adjacent the outer window pane, and a second surface between the outer window pane and the inner window pane that is selectively patterned and movable, and a handle directly connected to the second surface;
wherein the first surface and the second surface are arranged one over the other,
wherein the second surface abuts the first surface and is adapted to slide over the first surface, and
wherein the second surface is adapted to be moved relative to the first surface by the handle to alter the incident light passing through the roof window.

2. The vehicle of claim 1, wherein the first surface comprises a first stripe pattern that diminishes a transmission of the roof window, and the second surface comprises a second stripe pattern that substantially corresponds to the first stripe pattern and gradually darkens gaps between stripes of the first stripe pattern.

3. The vehicle of claim 1, wherein the the inner window pane is formed with a recess, wherein the handle extends through the recess and is fixed to the second surface, and wherein the handle is configured to slide longitudinally in the recess to move the second surface relative to the first surface.

4. The vehicle of claim 1, wherein the first surface comprises a first polarization pattern that impairs a transmission of the roof window, wherein the second surface comprises a second polarization pattern that corresponds to the first polarization pattern, and wherein a linear shifting of the second polarization pattern relative to the first polarization pattern is adapted to darken the roof window.

5. The vehicle of claim 1, wherein the first surface comprises a first polarization pattern that impairs a transmission of the roof window, and the second surface comprises a second polarization pattern that corresponds to the first polarization pattern and a turning of the second polarization pattern relative to the first polarization pattern is adapted to darken the roof window.

6. The vehicle of claim 1, wherein a surface of the roof window directed toward the passenger compartment comprises a coating that forms the first surface.

7. The vehicle of claim 1, wherein a surface of the roof window directed toward the passenger compartment is covered by an immovably fixed film that forms the first surface.

8. The vehicle of claim 1, wherein the second surface comprises a film that is adapted for removal by kinematics.

9. The vehicle of claim 8, further comprising a shifting mechanism adapted to move the film on a clip with latching settings.

10. The vehicle of claim 8, further comprising a turning mechanism adapted to move the film.

11. The vehicle of claim 8, further comprising a roof arch adapted to support the film in the roof area.

12. The vehicle of claim 11, wherein the roof arch comprises a pre-stressed latching mechanism adapted to latch in a lowered area of a carrier flange of the roof structure.

13. The vehicle of claim 1, wherein the roof window is incorporated in an extruded profile that accommodates a first and immovably fixed film with the first surface and a second movable film with the second surface, and wherein the extruded profile is substantially sealed relative to the roof structure with a profile rubber.

14. The vehicle of claim 1, wherein the first surface is formed by a first optical film, wherein the second surface is formed by a second optical film, and further comprising a third optical film, wherein the three optical films are arranged one over the other, wherein the first surface and the second surface comprise a polarization pattern with a substantially identical structure, and wherein approximately half of the third optical film is provided with a second polarization pattern.

15. The vehicle of claim 1 wherein the outer window pane has an inner side, and wherein the first surface completely covers the inner side of the outer window pane.

16. The vehicle of claim 1 wherein the first surface and the second surface are selectively patterned with stripes having a uniform stripe width, and wherein the second surface is movable by one stripe width.

17. A vehicle having a transparent roof area comprising:
a roof structure formed with an outer window;
a first film fixed in position adjacent the outer window and having a polarization pattern including a first portion and a second portion;
a second film positioned adjacent the first film and having the polarization pattern including the first portion and the second portion, wherein the second film is configured to move relative to the first film between a transparent configuration wherein the first portions of the polarization patterns of the first and second films are aligned and transparent and a darkened configuration wherein the first portion of the polarization pattern of the first film is aligned with the second portion of the polarization pattern of the second film; and a third film positioned adjacent the first and second films and having the first portion of the polarization pattern, wherein the third film is configured to move relative to the first film between a secondary transparent configuration wherein the first portions of the polarization patterns of the first and third films are aligned and transparent and a half-darkened configuration wherein the first portion of the polarization pattern of the third film is aligned with the second portion of the polarization pattern of the first film.

18. The vehicle of claim 17 wherein the first portion comprises first alternating stripes, and wherein the second portion comprises second alternating stripes.

19. The vehicle of claim 17 wherein the second film is configured to move back and forth along a first direction, and wherein the third film is configured to move back and forth along the first direction.

20. The vehicle of claim 17 further comprising an inner window, wherein the second film is positioned between the first film and the inner window.

* * * * *